Nov. 3, 1953

W. J. OAKLEY 2,657,537

MASTER CYLINDER WITH COMPENSATING VALVE

Filed Oct. 26, 1950

INVENTOR
WILBUR J. OAKLEY
BY Willits Harlman & Feher
his ATTORNEYS

Patented Nov. 3, 1953

2,657,537

UNITED STATES PATENT OFFICE 2,657,537

MASTER CYLINDER WITH COMPENSATING VALVE

Wilbur J. Oakley, Dayton, Ohio, assignor to General Motors Corporation, Detroit, Mich., a corporation of Delaware Application October 26, 1950, Serial No. 192,319

10 Claims. (Cl. 60—54.6)

This invention relates to improvements in fluid displacement devices particularly adapted to provide fluid pressure for actuating hydraulic brakes.

It is among the objects of the present invention to provide fluid replenishing means for the cylinder of a fluid pressure device said means being operative to establish fluid flow from a reservoir into the cylinder to compensate for fluid losses due to leaks in the closed fluid circuit in which said pressure device is connected.

A further object of the present invention is to locate the fluid replenishing means outside the range of piston travel in the cylinder, so that mutilation of said gasket by the sharp and sometimes rough edge of the opening in the cylinder wall is entirely eliminated.

A still further object of the present invention is to provide a fluid pressure device with a replenishing valve between its reservoir and cylinder and a piston actuated operator for said valve, so designed and constructed that the length of the cylinder is kept within a normal minimum.

Further objects and advantages of the present invention will be apparent from the following description, reference being had to the accompanying drawing wherein a preferred embodiment of the present invention is clearly shown.

Figure 3:
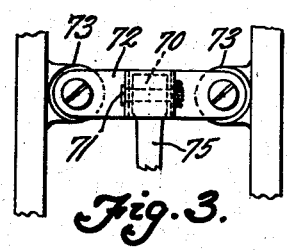
Fig. 3 is a fragmentary detail view taken in the direction of the arrow 3 in Fig. 1.

The present invention relates to a fluid pressure device used as the master cylinder for actuating hydraulic brakes. Actuating this device by the ordinary foot pedal or similar means provides fluid pressure to operate the various braking elements of the vehicle which are in circuit connection with the device. The device comprises a housing 20 providing a fluid containing reservoir 21 and a cylinder 22. The reservoir portion housing of the housing 20 has a cover 23 attached to the housing in any suitable manner, the cover having an orifice closed by a removable screw plug 24. The one end of the cylinder is interiorly threaded to receive the end head plug 25 having a central opening 26, the outer end of which is interiorly threaded to receive any suitable pipe connection by means of which the brake to be operated is connected with the pressure device. The inner end surface of the end head 25 has a resilient washer 27 attached thereto in any suitable manner, this washer acting as a seat for valve mechanism to be described. The opposite end of the cylinder is recessed providing a shoulder 28 against which an abutment ring 29 is maintained by a spring ring 30 seated in an annular groove in the peripheral wall of the recess.

The cylinder 22 contains a reciprocative solid piston 35, the inner end surface of which has a sealing gasket 36 secured thereto in any suitable manner. The opposite or outer end of piston 35 is recessed as at 37, said recess receiving the one end of the actuator rod 38 by means of which piston 35 may be moved inwardly of the cylinder 22 away from the abutment ring 29 which piston 35 normally engages. A rubber dust cover cap fits about the cylinder housing portion and the rod 38 and flexes as the rod 38 is reciprocated during actuation of the device. This rod is attached to the manual actuating device such as a pedal or a lever usually provided in a motor vehicle.

A two way fluid flow control valve is provided at the end of the cylinder having the head member 25. This two way valve mechanism consists of a bell shaped shell portion 40 having an outwardly extending flange 41 which engages and seats upon the flexible washer 27 attached on the inner end of closure head 25. A resilient valve member 42 is secured centrally and interiorly of the shell portion 40 by a rivet 43, this resilient valve member 42 flexing to conform with the inner contour of the shell portion 40 and thereby closing orifices 44 in said shell portion. The shell portion 40 is yieldably maintained in seating engagement with the washer 27 by a spring 45 interposed between said shell portion 40 and an abutment ring 46 engaging the gasket 36 carried by the piston 35. This spring 45 also maintains the piston 35 in engagement with the actuator rod 38 urging both the piston 35 and said rod 38 outwardly of the piston toward the left as regards Fig. 1.

Figure 1:
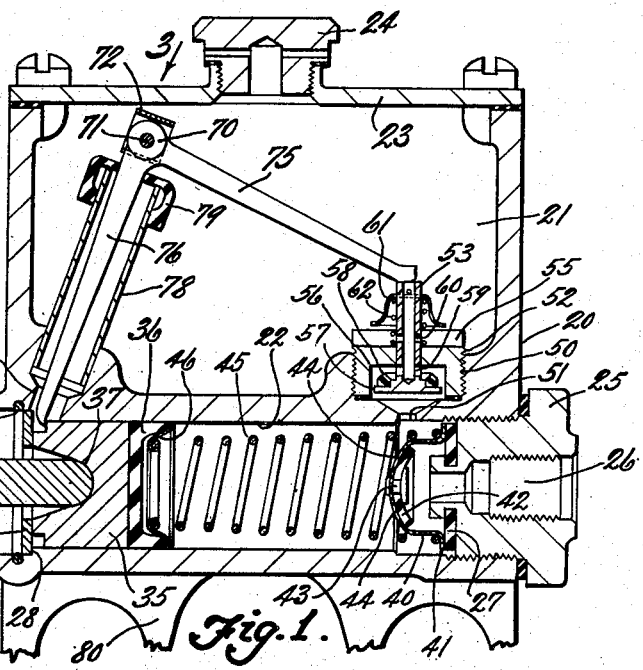
Fig. 1 is a longitudinal section of the fluid pressure device in normal position.
Figure 4:
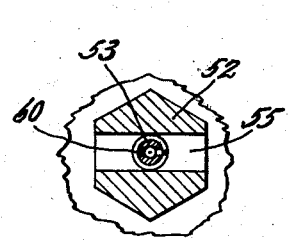
Fig. 4 is a detail sectional view of the replenishing valve mechanism taken along the line and in the direction of the arrows 4—4 of Fig. 2.

The portion of the device so far described operates as follows: When the hydraulic brake, in operative connection with the cylinder 22 through a pipe attached to the end head 25, is to be operated to apply braking effort, the operator actuates the rod 38 through the suitable pedal or lever not shown causing said rod 38 to urge the piston 35 inwardly of the cylinder toward the valve mechanism including shell 40 against the effect of spring 45. In response to this movement of piston 35, pressure will be exerted upon the fluid within the cylinder 22, said fluid pressure flexing the valve member 42 out of peripheral contact with the shell member 40 to establish fluid flow through the orifice 44 in the shell member through the central opening in the closure head 25 and its connected pipe to the brake thereby actuating the brake to exert braking effort. When the manual power application is removed from rod 38, the spring 45 will move the piston on its return stroke away from the valve mechanism including the shell 40 into the normal position in which the piston 35 engages the abutment ring 28. This will cause the fluid from the brake cylinder and the line or pipe leading from said cylinder to the passage 26 in the end head 25, the return flow of fluid moving the valve shell portion 40 from engagement with the flexible washer 27 and thereby establishing the fluid flow back into the cylinder. If all of the fluid forced into the pipes connected with the brakes by the forward movement of the piston is not completely returned to the cylinder 22 when the piston 35 is returned to its normal position as shown in Fig. 1, or if there is a deficiency of fluid in the fluid circuit due to leaks or losses for any reason, then it is necessary to provide a replenishing supply of fluid which will be directed into the working chamber of the cylinder or the space between the piston 35 and valve mechanism including valve portion 40 so that this working chamber is completely filled. The incomplete filling of this chamber will result in a spongy lost motion braking power application which is undesirable. To obtain immediate and solid response it is necessary that the working chamber of the cylinder be completely filled.

To eliminate the spongy action as aforementioned and to maintain the cylinder 22 completely filled with fluid under all circumstances, a replenishing source of fluid is provided permitting fluid from the reservoir to enter the working chamber of the cylinder 22 when necessary. In the present invention applicant provides an interiorly threaded recess 50 in the wall of the housing between the reservoir and cylinder and on the reservoir side of said housing. This recess communicates with the cylinder through a port or opening into cylinder adjacent or more specifically radially opposite the shell 40. The threaded recess 50 receives a screw plug 52 having a central recess in which the valve stem 53 is slidably supported. A transverse slot 55 is provided in the outer end of the screw plug 52, the inner end of the screw plug is recessed as at 56. The valve stem 53 is hollow or tubular shaped for a great portion of its length, said stem having a head portion in the form of an annular flange 57 upon which a flexible sealing ring 58 forming the valve is secured. Adjacent this valve 58 side passages 59 in the stem provide communication between the inside and outside of said stem. Similar side passages 60 in constant communication with the reservoir 21 under all conditions are provided in the valve stem to connect the interior of said stem with the exterior thereof. An abutment washer 61 is secured to the stem, said abutment washer having one end of a spring 62 engaging it, the other end of the spring resting upon the screw plug 52 at the bottom of the transverse slot 55 thereof. This spring 62 normally yieldably urges the stem 53 and the valve 58 supported thereon so as to maintain said valve 58 in engagement with the inner flat wall of the recess 56 in the screw plug whereby to shut off communication between the interior of the valve stem 53 and the recess 56 as shown in the Fig. 2. Recess 56 is in communication with the port or opening 51 leading into the cylinder 22.

The means for actuating the replenishing valve so as to provide communication between the reservoir and cylinder at the proper time comprises a lever having a hub portion 70 pivotally supported by a pin 71 secured to a saddle 72 which is anchored to oppositely disposed ears 73 on the two sides of the reservoir chamber 21. Hub 70 has two arm portions 75 and 76 extending therefrom in substantially 90° relation, the arm 75 being in constant engagement with the valve stem 53 of the replenishing valve. Arm 76 extends through an opening 77 in the housing wall into the cylinder 22, the end of arm 76 projecting into the path of movement of the piston 35. A tube 78 secured in a recess in a wall of the housing coaxial with the opening 77 surrounds the lever 76 and extends upwardly into the reservoir terminating adjacent the hub 70. A resilient sealing cap 79 fits over the tube 78 and about the lever 76 thereby preventing fluid from the reservoir to leak through the tube 78 into the cylinder, the level of the fluid within the reservoir being normally beneath the top of the tube 78. It will be noted that the outer end of the piston, that is the end of the piston engaged by the manually operable actuator 38 or the end of the piston opposite its gasketed working end is engageable with the lever 76, the end of which extends into the path of piston movement. Thus the piston 35 which displaces fluid within the cylinder 22 operates in an area between the replenishing valve actuator, lever 76 and the port 51 leading from the cylinder to the replenishing valve mechanism. This type of construction permits the cylinder to be of normal minimum length.

Figure 2:
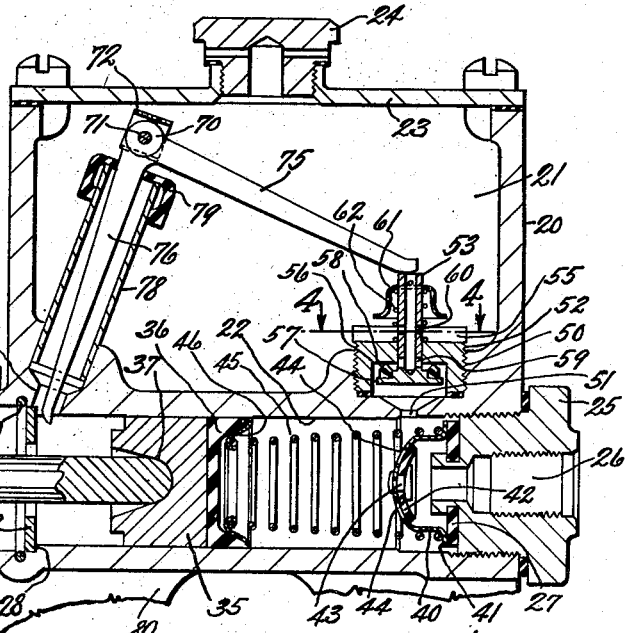
Fig. 2 is a view similar to Fig. 1, but illustrating the piston midway on its pressure stroke.

This replenishing mechanism acts in the following manner: As the piston 35 is permitted to be returned from normal position by the spring 45 in response to the removal of the manual power being applied to the actuator rod 38, said piston will shortly before reaching its extreme rest or normal position engage lever 76 moving said lever clockwise as regards the drawings to move its attached lever 75 in a similar direction thereby pushing the valve stem 53 within the reservoir space downwardly through the screw plug in which said valve stem is operably supported. This action moves the valve stem 53 from the position as shown in Fig. 2 where communication between the reservoir and the cylinder is shut off, into the position as shown in Fig. 1 in which communication between the reservoir 21 and the cylinder 22 is established through the side openings 59, the inside of the hollow stem 53 through side passages 59 past the unseated valve 58 through port 51 into the cylinder. Any supply of fluid needed within the cylinder 22 completely to fill it is now provided from the reservoir 21. As soon as manual power is applied to the actuating rod 38, the piston 35 will be moved from the position shown in Fig. 1 toward the valve mechanism at the end of the cylinder as shown in Fig. 2. As the piston 35 moves from its normal position lever 76 will be released, and be permitted to be moved counterclockwise through the effect of spring 62 moving valve stem 53 slidably upwardly into the reservoir and consequently the lever 75 counterclockwise. This permits the spring 62 again to yieldably maintain the valve 58 in engagement with the inner flat wall of the recess 56 in screw plug 55 and thereby shut off any communication between the cylinder 22 and the reservoir 21. Upon the return of the piston 35 to its normal position, a repetitious movement of the levers 75 and 76 in a clockwise direction will obtain, thereby again actuating the replenishing valve stem 53 from the reservoir side to reestablish communication between the reservoir 21 and the cylinder 22.

It will be noted that the replenishing valve and its parts as well as the actuator therefor are all in the reservoir side of the device and the only portion of any mechanism associated with the replenishing valve is the extreme end of lever 76 which extends into the cylinder and the path of movement of piston 35, this being at the extreme end of the cylinder opposite the two-way valve mechanism and at the actuator engaged end of the piston 35.

Any suitable mounting lugs 80 are formed integral with the cylinder, these mounting lugs providing means for attaching the device in proper position on the vehicle with which it is used.

While the embodiment of the present invention as herein disclosed, constitutes a preferred form, it is to be understood that other forms might be adopted.

What is claimed is as follows:

1. In a device of the character described, the combination with a cylinder provided with an orificed head; a valve mechanism in the cylinder operative to control fluid through said head in either direction; a fluid reservoir; a port providing communication between said reservoir and cylinder adjacent the valved head; a reciprocative piston in the cylinder; reciprocative means for actuating the piston; a valve yieldably urged to shut off communication between the reservoir and cylinder; an actuator pivotally supported within the reservoir and independent of the piston actuating means and engaging the valve, inside the reservoir, said actuator extending into the cylinder and into the path of piston movement so as to be directly engageable by the piston and moved by the piston to actuate the valve and open communication between the reservoir and cylinder only when said piston is in normal, substantially furthermost position from said valve mechanism.

2. In a device of the character described, the combination with a housing providing a fluid reservoir and a cylinder; a port connecting the fluid reservoir with the cylinder adjacent one end thereof; an orificed plug in said one end of the cylinder, the inner end of said plug being in close proximity to the port, said end having a sealing washer attached thereto; a solid piston slidable in the cylinder and being manually operable toward the plug; a sealing gasket engaging the end of the piston more adjacent the plug; a two-way valve mechanism having one portion engageable with the sealing washer on the plug; a spring interposed between the piston and valve mechanism, urging the gasket upon the piston and the piston away from the valve mechanism and urging the said portion of the valve mechanism upon the washer on the plug; a valve yieldably urged to shut off communication between the reservoir and cylinder through the port; and a lever pivoted in the reservoir portion of the housing, said lever having an arm constantly engaging the valve and another arm extending into the cylinder through a hole in the wall thereof and directly engageable by the end of the piston opposite its gasket engaged end for actuating the valve to open communication between the reservoir and cylinder.

3. In a device of the character described, the combination with a housing providing a fluid reservoir and a cylinder; a port connecting the fluid reservoir with the cylinder adjacent one end thereof; an orificed plug in said one end of the cylinder, the inner end of said plug being in close proximity to the port, said end having a sealing washer attached thereto; a solid piston slidable in the cylinder and being manually operable toward the plug; a sealing gasket engaging the end of the piston more adjacent the plug; a two-way valve mechanism having one portion engageable with the sealing washer on the plug; a spring interposed between the piston and valve mechanism, urging the gasket upon the piston and the piston away from the valve mechanism and urging the said portion of the valve mechanism upon the washer on the plug; a valve yieldably urged to shut off communication between the reservoir and cylinder through the port; an opening in the housing connecting the reservoir with the cylinder at a point remote from the port; and means pivotally supported within the reservoir portion of the housing, said means having two arms, one of which constantly engages the valve, the other extending through said opening into the cylinder and being engageable by the piston when spring returned to its normal position for establishing communication between the reservoir and cylinder through the port.

4. In a device of the character described the combination with a housing providing a fluid reservoir and a cylinder and two openings respectively connecting the reservoir with the cylinder at points adjacent its ends; an orificed plug in the one end of the cylinder, the inner end of said plug having a resilient washer attached thereto so as to be in juxtaposition to the one opening; a solid piston reciprocative in the cylinder and having a sealing element engaging its inner end; a two-way valve mechanism yieldably urged against the resilient washer on the cylinder end plug by a spring which also engages the sealing element on the piston and urges said piston and element away from the valve mechanism; a valve cage providing a replenishing valve normally, yieldably urged to shut off communication between the reservoir and cylinder through said one opening adjacent the plug; and a lever pivotally supported within the reservoir, said lever having two arms, one of which engages the replenishing valve, the other extending through the other opening into the cylinder and being engageable by the end of the piston opposite the end having the sealing gasket for actuating the replenishing valve to establish communication between the reservoir and cylinder when said piston approaches its position in the cylinder most remote from the valve mechanism therein.

5. A device in accordance with claim 4 in which, however, a tube is provided in the reservoir, one end of the tube extending into a recess of the said other opening and through which the said other arm of the lever extends, said tube extending above the normal level of the fluid in the reservoir.

6. In a fluid pressure device the combination with a housing providing a fluid reservoir and a cylinder; two spaced openings in the housing connecting the reservoir with the cylinder; an orificed head at one end of the cylinder; a solid piston reciprocative in the cylinder between said two spaced openings; a two-way valve mechanism within the cylinder; a spring interposed between the piston and said valve mechanism, urging the valve mechanism against the cylinder head and the piston away from said head; an actuator engaging the piston for moving it toward the said valve mechanism said actuator extending from the cylinder; a valve yieldably urged to shut off communication between the reservoir and cylinder through one of said openings; and means within the reservoir, engaging the said valve and extending through the second opening into the cylinder, said means being engageable by the actuator engaged side of the piston to operate the valve and establish communication between the reservoir and cylinder when said piston substantially reaches its normal position under the effect of the spring.

7. In a fluid pressure device the combination with a housing providing a fluid reservoir and a cylinder having an orificed head member at one end; a normally closed replenishing valve operative to provide communication between the reservoir and the end of the cylinder adjacent the head member; a two-way valve in the cylinder, operative to control fluid flow through the orificed head member in both directions; a solid piston in the cylinder; an actuator extending into the end of the cylinder opposite the head member and engaging the piston for moving it toward said head member; a spring interposed between the two-way valve mechanism and the piston said spring urging said valve mechanism upon the head member and the piston away therefrom; and means pivotally mounted within the fluid reservoir, engaging the replenishing valve and extending through an opening in the cylinder portion of the housing, spaced from the replenishing valve, said means being directly engageable by the piston for operating the replenishing valve to establish communication between the cylinder and reservoir.

8. In a fluid pressure device the combination with a housing providing a fluid reservoir and a cylinder having an orificed head member at one end; a normally closed replenishing valve operative to provide communication between the reservoir and the end of the cylinder adjacent the head member; a two-way valve in the cylinder, operative to control fluid flow through the orificed head member in both directions; a solid piston in the cylinder; a reciprocative actuator extending into the end of the cylinder opposite the head member and engaging the piston for moving it toward said head member; a spring interposed between the two way valve mechanism and the piston said spring urging said valve mechanism upon the head member and the piston away therefrom, and pivoted means directly engaged and operable by the piston for actuating the replenishing valve on the reservoir side thereof to establish communication between the reservoir and cylinder, said pivoted means being separate from and independent of the piston actuator.

9. In a device of the character described, the combination with a fluid reservoir; a cylinder; a two-way fluid flow control valve at one end of the cylinder; a piston in the cylinder; an actuator extending into the cylinder and engaging the outer end of the piston, said actuator being longitudinally operative to move the piston for forcing fluid from the cylinder through said valve; a spring between the valve and piston, said spring being operative to return the piston to normal position and draw fluid through said valve into the cylinder; a normally closed replenishing valve between the reservoir and cylinder, said valve being operative to establish communication between said reservoir and cylinder; and means within the reservoir separate from and independent of the piston actuator and extending into the path of piston movement so as to be directly engaged by the end of the piston said means being moved when so engaged, to operate the replenishing valve on the reservoir side.

10. In combination with a housing having a fluid reservoir and a cylinder in which a piston is reciprocative to displace fluid in the cylinder under the control of a two-way valve at the one end of the cylinder; a reciprocative piston actuator extending into the other end of the cylinder and engaging the piston; a normally closed replenishing valve operative to establish a fluid flow from the reservoir into the cylinder; and pivoted means separate from and independent of the piston actuator engaging the replenishing valve inside the reservoir, said means being directly engageable by the actuator engaged side of the piston for operating the replenishing valve.

WILBUR J. OAKLEY.

References Cited in the file of this patent

UNITED STATES PATENTS

| Number | Name | Date |
| --- | --- | --- |
| 1,764,179 | Loughead | June 17, 1930 |
| 1,983,884 | Hele-Shaw et al. | Dec. 11, 1934 |
| 2,114,991 | Bowen | Apr. 26, 1938 |
| 2,224,125 | Dick | Dec. 10, 1940 |
| 2,232,113 | Katcher | Feb. 18, 1941 |
| 2,258,257 | Main | Oct. 7, 1941 |
| 2,281,330 | Sinclair | Apr. 28, 1942 |

FOREIGN PATENTS

| Number | Country | Date |
| --- | --- | --- |
| 410,243 | Great Britain | May 17, 1934 |